(12) United States Patent
Wasserbauer et al.

(10) Patent No.: US 8,994,837 B2
(45) Date of Patent: Mar. 31, 2015

(54) IMAGE PROCESSING DEVICES AND IMAGE PROCESSING METHODS OF MOVING OBJECTS

(75) Inventors: Andreas Wasserbauer, Pettenbach (AT); Manfred Meindl, Linz (AT); Juergen Haas, Marchtrenk (AT); Andreas Gstoettner, Linz (AT)

(73) Assignee: Intel Mobile Communications GmbH, Neubiberg (DE)

( * ) Notice: Subject to any disclaimer, the term of this patent is extended or adjusted under 35 U.S.C. 154(b) by 759 days.

(21) Appl. No.: 12/954,702

(22) Filed: Nov. 26, 2010

(65) Prior Publication Data

US 2012/0133785 A1    May 31, 2012

(51) Int. Cl.
    *H04N 5/228*    (2006.01)
    *H04N 5/232*    (2006.01)
    *G06T 3/40*     (2006.01)

(52) U.S. Cl.
    CPC .......... *H04N 5/23229* (2013.01); *G06T 3/4053* (2013.01)
    USPC ................................. 348/208.6; 348/208.99

(58) Field of Classification Search
    None
    See application file for complete search history.

(56) References Cited

U.S. PATENT DOCUMENTS

| | | | |
|---|---|---|---|
| 2004/0001149 A1 | 1/2004 | Smith | |
| 2006/0119710 A1* | 6/2006 | Ben-Ezra et al. | 348/208.99 |
| 2007/0189386 A1* | 8/2007 | Imagawa et al. | 375/240.12 |
| 2007/0222864 A1* | 9/2007 | Hiraga et al. | 348/208.4 |
| 2008/0175519 A1* | 7/2008 | Nagumo | 382/299 |
| 2008/0309778 A1* | 12/2008 | Tabatabai et al. | 348/222.1 |
| 2009/0079876 A1* | 3/2009 | Takeshima et al. | 348/699 |
| 2009/0110568 A1* | 4/2009 | Schwarzkopf et al. | 417/269 |
| 2009/0190013 A1* | 7/2009 | Hiraga et al. | 348/296 |
| 2009/0208062 A1* | 8/2009 | Sorek et al. | 382/107 |
| 2009/0284610 A1* | 11/2009 | Fukumoto et al. | 348/208.99 |

FOREIGN PATENT DOCUMENTS

EP    2088787 A1    8/2009

* cited by examiner

*Primary Examiner* — Justin P Misleh

(57) ABSTRACT

In an embodiment, an image processing device is provided. The image processing device may include: a first image acquirer configured to acquire a first image of a first spatial resolution; a second image acquirer configured to acquire a second image of a second spatial resolution, wherein the second spatial resolution may be higher than the first spatial resolution; a determiner configured to determine in the first image a location of a part of the first image that corresponds to a pre-determined part of the second image based on a pre-determined similarity criterion; and a copying circuit configured to copy the pre-determined part of the second image to a location in an output image based on the determined location.

22 Claims, 7 Drawing Sheets

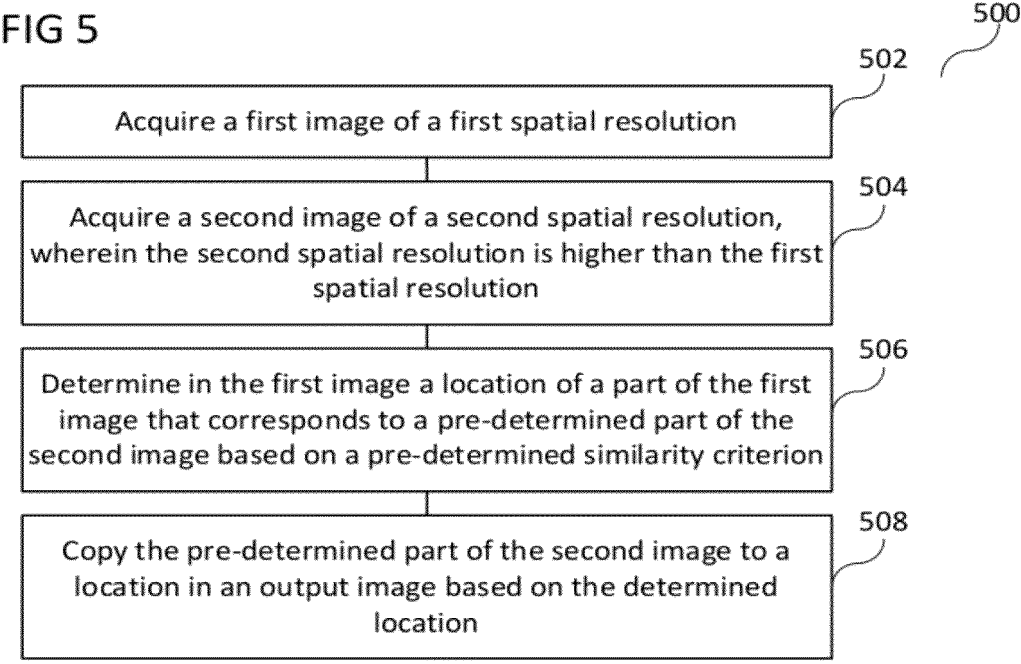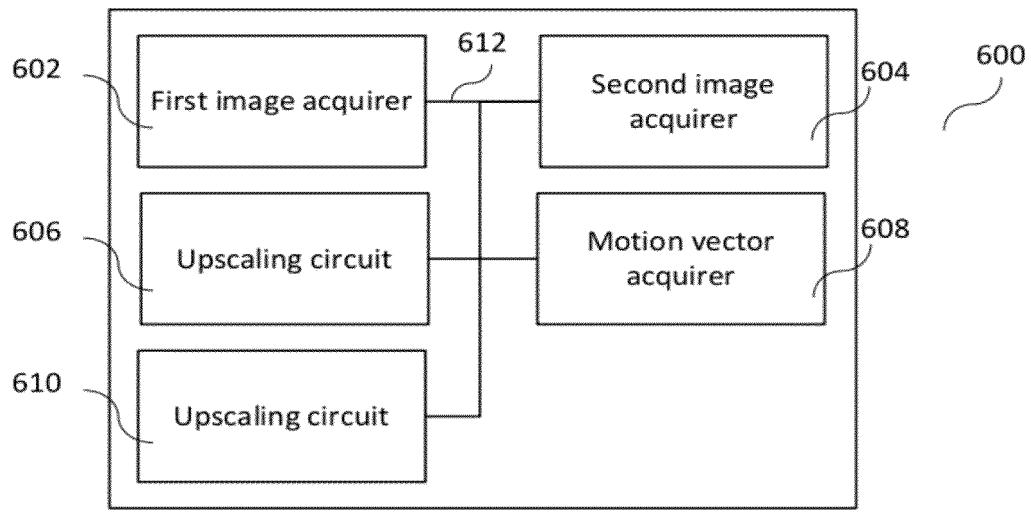

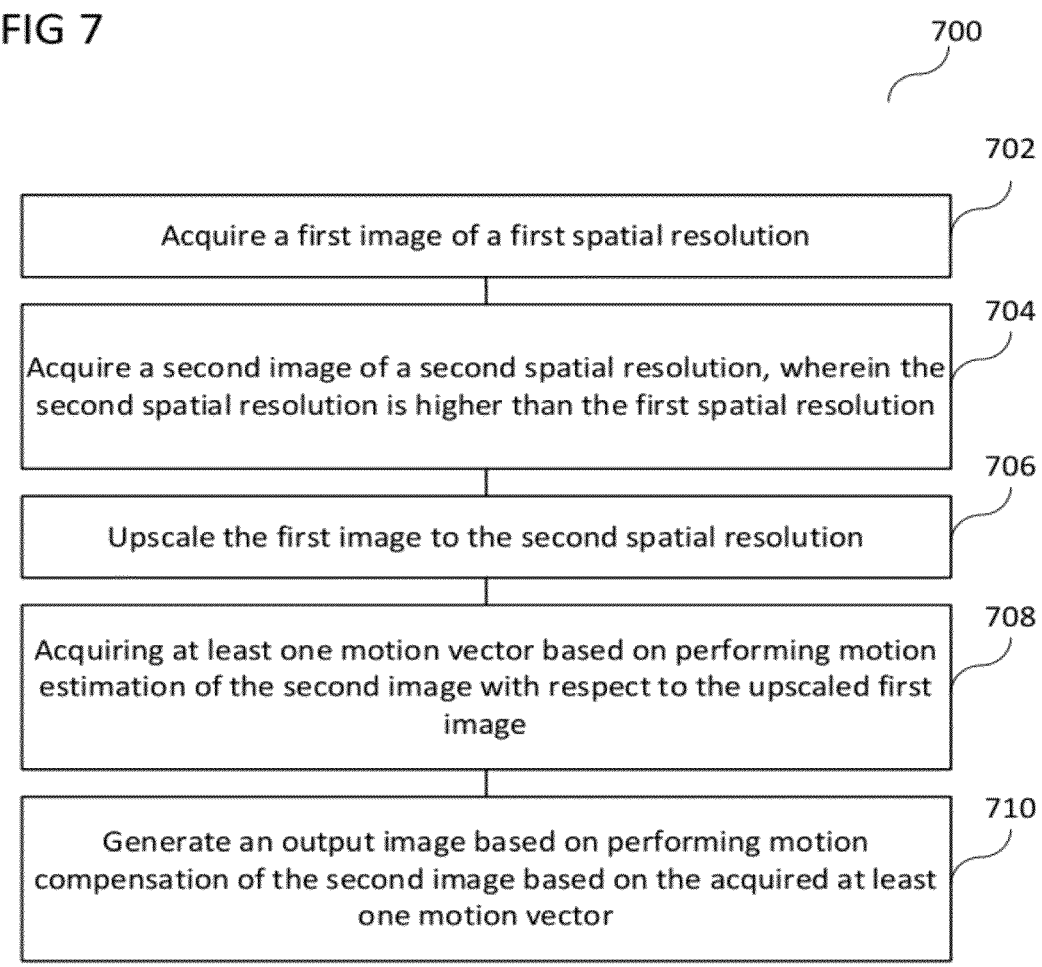

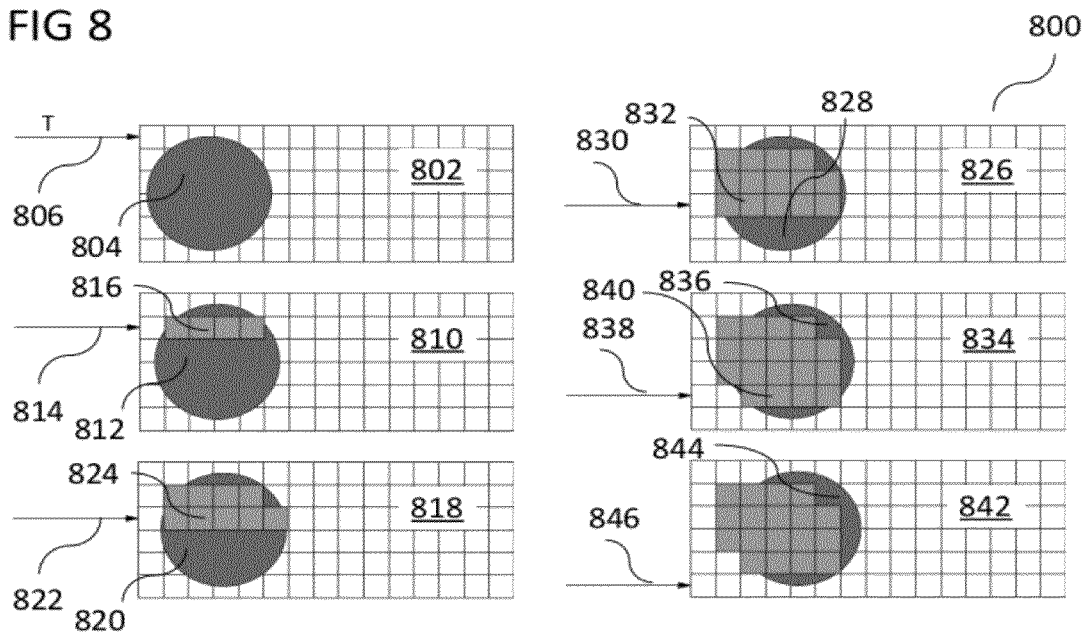
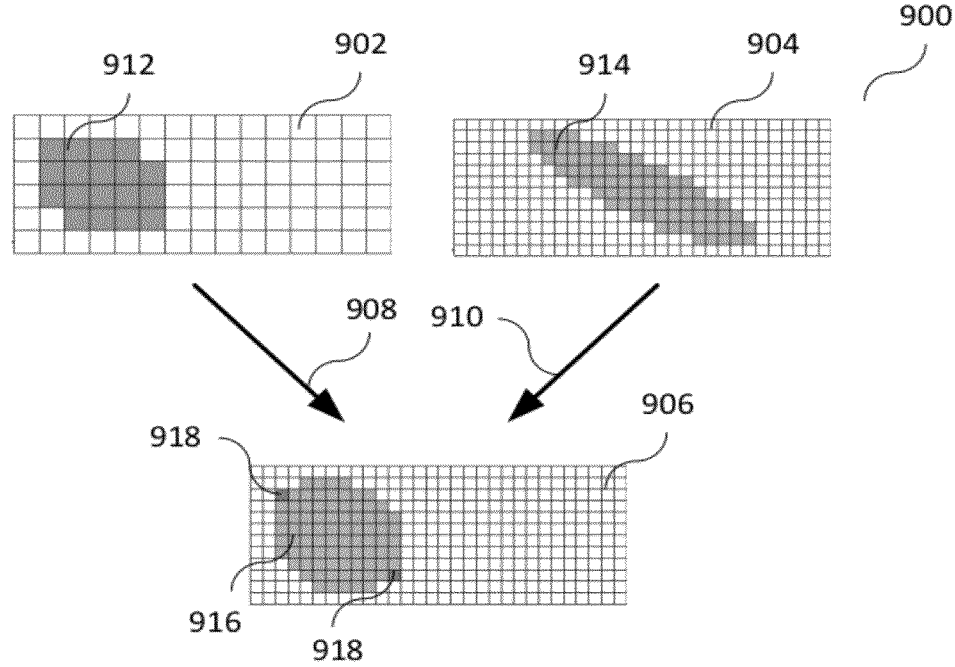

1002

1102

1200
1202

1300
1302

IMAGE PROCESSING DEVICES AND IMAGE PROCESSING METHODS OF MOVING OBJECTS

TECHNICAL FIELD

Embodiments relate generally to image processing devices and image processing methods.

BACKGROUND

Camera modules in cost driven products (for example virtually all non-dedicated camera enabled consumer devices such as mobile phones or multimedia players/recorders) may implement the shutter mechanism in an electronic manner called "rolling shutter". Unlike in classical camera devices, where sensor (or film) exposure may be controlled by a mechanical blind, electronic shutters may do so by activating and subsequently deactivating the respective sensor elements. While so-called synchronous shutters may activate and deactivate all light sensitive cells at the same time, rolling shutters may work by exposing the sensor row by row. Synchronous shutters may involve read out logic since the transfer to shadow memory may be desired to take place synchronously for all rows, thus increasing devices complexity and, in turn, cost.

Rolling shutter based solutions may spread the read-out time nearly over the whole frame cycle, thus allowing for relatively slow and small buffers on-chip. In practice rolling shutter based systems may therefore be the prevalent solution in all but the highest quality segments in consumer digital photography. The advantage of cost and complexity may come at a price though: Since the individual rows may be exposed to light at different points in time, fast moving objects (or camera movements/pans) may lead to noticeable artifacts.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 5 shows a flow diagram illustrating an image processing method in accordance with an embodiment;

FIG. 6 shows an image processing device in accordance with an embodiment;

FIG. 7 shows a flow diagram illustrating an image processing method in accordance with an embodiment;

FIG. 8 shows a diagram illustrating image acquisition of a first image in accordance with an embodiment;

FIG. 9 shows a diagram illustrating a generation of an output image in accordance with an embodiment;

DESCRIPTION

Figure 1:
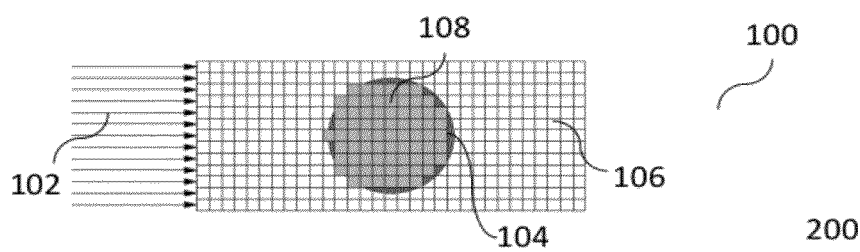
FIG. 1 shows a diagram illustrating image acquisition by a synchronous shutter.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any embodiment or design described herein as "exemplary" is not necessarily to be construed as preferred or advantageous over other embodiments or designs.

The image processing device may include a memory which may for example be used in the processing carried out by the end user device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

Various embodiments are provided for devices, and various embodiments are provided for methods. It will be understood that basic properties of the devices also hold for the methods and vice versa. Therefore, for sake of brevity, duplicate description of such properties may be omitted.

Camera modules in cost driven products (for example virtually all non-dedicated camera enabled consumer devices such as mobile phones or multimedia players/recorders) may implement a shutter mechanism in an electronic manner called "rolling shutter". Unlike in classical camera devices, where sensor (or film) exposure may be controlled by a mechanical blind, electronic shutters may do so by activating and subsequently deactivating the respective sensor elements.

While so-called synchronous shutters may activate and deactivate all light sensitive cells at the same time, rolling shutters may work by exposing the sensor row by row. Synchronous shutter may involve read out logic since the transfer to shadow memory may be desired to take place synchronously for all rows, thus increasing devices complexity and, in turn, cost.

Rolling shutter based solutions may spread the read-out time nearly over the whole frame cycle, thus allowing for relatively slow and small buffers on-chip. In practice rolling shutter based systems may therefore be the prevalent solution in all but the highest quality segments in consumer digital photography. The advantage of cost and complexity may come at a price though: Since the individual rows may be exposed to light at different points in time, fast moving objects (or camera movements/pans) may lead to noticeable artifacts. In commonly used devices, this is taken into account and widely regarded as compromise of quality and cost. In commonly used devices, reduction of the aforementioned artifacts may be achieved by reducing the readout time for the frame, thus compromising the cost advantage of the rolling shutter mechanism.

According to various embodiments, devices and methods may be provided for reducing the artifacts without compromising the cost advantages of a rolling shutter sensor.

FIG. 1 shows a diagram 100 illustrating image acquisition by a synchronous shutter. For example, a scene of which a digital image is to be taken may consist of a ball 104 (shown in dark grey) moving from left to right with respect to the camera. A synchronous shutter may record the scene at once, in other words during exposure time, like indicated by arrows 102. Thus, the ball 104 may be represented on the image plain 106 of the image as pixels 108 (shown in light grey). Although the ball may be moving, the shape of the pixels 108 may be approximately the shape of the ball 104, because all pixel may have been taken at the same time.

Figure 2:
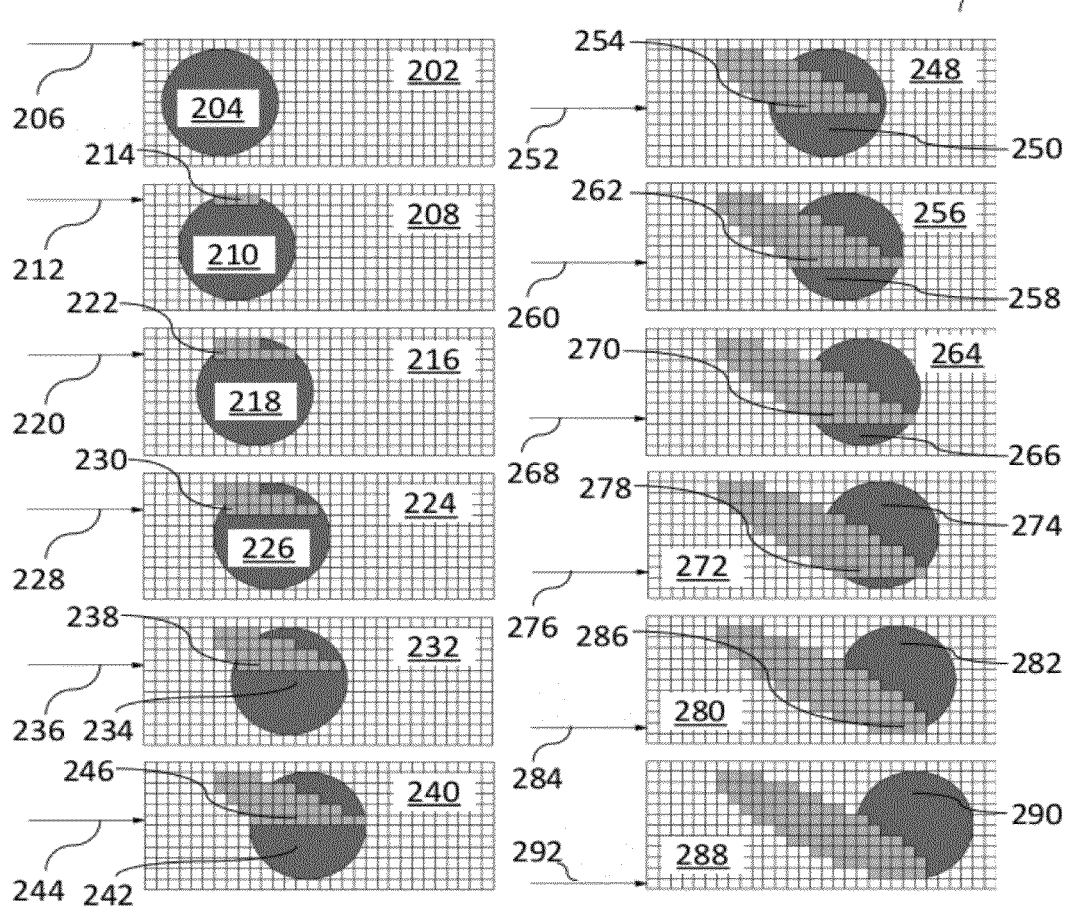
FIG. 2 shows a diagram illustrating image acquisition by a rolling shutter.

FIG. 2 shows a diagram 200 illustrating image acquisition by a rolling shutter. The rolling shutter may record the image line by line; thus a moving ball may be depicted as a sheared ellipsoid on the sensor, like will be explained in more detail below.

For example, at a time T, with the rolling shutter mechanism, the pixels of the first line of the image may be acquired, like indicated by a first arrow 206. No pixels of the first line may correspond to the position of the ball 204 at time T, so that only background pixels (shown in white) may be acquired, and the digital image 202 that has been acquired so far may include only a first line of white pixels.

For example, at a time T+1, with the rolling shutter mechanism, the pixels of the second line of the image may be acquired, like indicated by a second arrow 212. The ball may have moved to the right in the mean time, so that now a ball 210 at a position more to the right than in the previous time step may be present. Pixels corresponding to the ball 210 may be acquired in the second line, so that a representation 214 of the ball in the second line may be acquired and may be added to the digital image 208 that has been acquired so far.

For example, at a time T+2, with the rolling shutter mechanism, the pixels of the third line of the image may be acquired, like indicated by a third arrow 220. The ball may have moved to the right in the mean time, so that now a ball 218 at a position more to the right than in the previous time step may be present. Pixels corresponding to the ball 218 may be acquired in the third line, so that a representation 222 of the ball in the third line may be acquired and may be added to the digital image 216 that has been acquired so far.

For example, at a time T+3, with the rolling shutter mechanism, the pixels of the fourth line of the image may be acquired, like indicated by a fourth arrow 228. The ball may have moved to the right in the mean time, so that now a ball 226 at a position more to the right than in the previous time step may be present. Pixels corresponding to the ball 226 may be acquired in the fourth line, so that a representation 230 of the ball in the fourth line may be acquired and may be added to the digital image 224 that has been acquired so far.

For example, at a time T+4, with the rolling shutter mechanism, the pixels of the fifth line of the image may be acquired, like indicated by a fifth arrow 236. The ball may have moved to the right in the mean time, so that now a ball 234 at a position more to the right than in the previous time step may be present. Pixels corresponding to the ball 234 may be acquired in the fifth line, so that a representation 238 of the ball in the fifth line may be acquired and may be added to the digital image 232 that has been acquired so far.

For example, at a time T+5, with the rolling shutter mechanism, the pixels of the sixth line of the image may be acquired, like indicated by a sixth arrow 244. The ball may have moved to the right in the mean time, so that now a ball 242 at a position more to the right than in the previous time step may be present. Pixels corresponding to the ball 242 may be acquired in the sixth line, so that a representation 246 of the ball in the sixth line may be acquired and may be added to the digital image 240 that has been acquired so far.

For example, at a time T+6, with the rolling shutter mechanism, the pixels of the seventh line of the image may be acquired, like indicated by a seventh arrow 252. The ball may have moved to the right in the mean time, so that now a ball 250 at a position more to the right than in the previous time step may be present. Pixels corresponding to the ball 250 may be acquired in the seventh line, so that a representation 254 of the ball in the seventh line may be acquired and may be added to the digital image 248 that has been acquired so far.

For example, at a time T+7, with the rolling shutter mechanism, the pixels of the eighth line of the image may be acquired, like indicated by an eighth arrow 260. The ball may have moved to the right in the mean time, so that now a ball 258 at a position more to the right than in the previous time step may be present. Pixels corresponding to the ball 258 may be acquired in the eighth line, so that a representation 262 of the ball in the eighth line may be acquired and may be added to the digital image 256 that has been acquired so far.

For example, at a time T+8, with the rolling shutter mechanism, the pixels of the ninth line of the image may be acquired, like indicated by an ninth arrow 268. The ball may have moved to the right in the mean time, so that now a ball 266 at a position more to the right than in the previous time step may be present. Pixels corresponding to the ball 266 may be acquired in the ninth line, so that a representation 270 of the ball in the ninth line may be acquired and may be added to the digital image 264 that has been acquired so far.

For example, at a time T+9, with the rolling shutter mechanism, the pixels of the tenth line of the image may be acquired, like indicated by a tenth arrow 276. The ball may have moved to the right in the mean time, so that now a ball 274 at a position more to the right than in the previous time step may be present. Pixels corresponding to the ball 274 may be acquired in the tenth line, so that a representation 276 of the ball in the tenth line may be acquired and may be added to the digital image 272 that has been acquired so far.

For example, at a time T+10, with the rolling shutter mechanism, the pixels of the eleventh line of the image may be acquired, like indicated by an eleventh arrow 284. The ball may have moved to the right in the mean time, so that now a ball 282 at a position more to the right than in the previous time step may be present. Pixels corresponding to the ball 282 may be acquired in the eleventh line, so that a representation 284 of the ball in the eleventh line may be acquired and may be added to the digital image 280 that has been acquired so far.

For example, at a time T+11, with the rolling shutter mechanism, the pixels of the twelfth line of the image may be acquired, like indicated by a twelfth arrow 292. The ball may have moved to the right in the mean time, so that now a ball 290 at a position more to the right than in the previous time step may be present. No pixels in the twelfth line may correspond to the ball 290, so that a line of white pixels corresponding to the background may be added to the digital image 288 that has been acquired so far.

Figure 3:
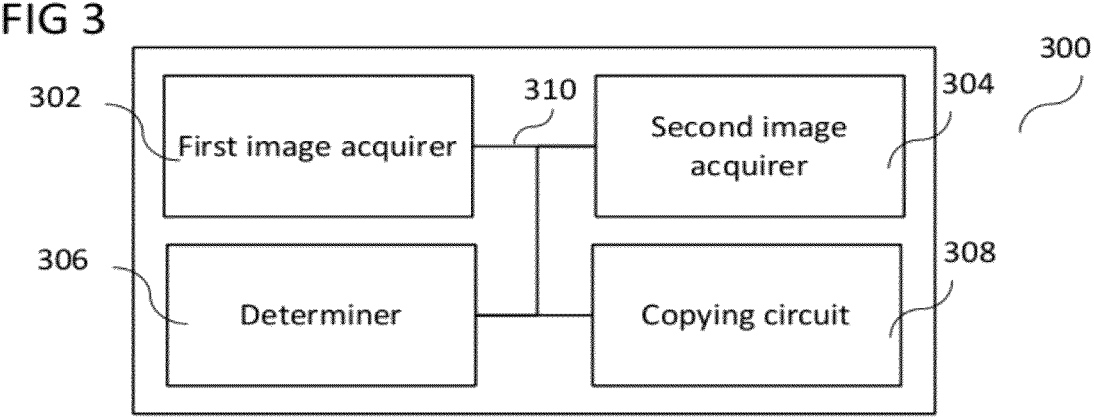
FIG. 3 shows an image processing device in accordance with an embodiment.

FIG. 3 shows an image processing device 300 in accordance with an embodiment. The image processing device 300 may include: a first image acquirer 302 configured to a acquire a first image of a first spatial resolution; a second image acquirer 304 configured to acquire a second image of a second spatial resolution, wherein the second spatial resolution may be higher than the first spatial resolution; a determiner 306 configured to determine in the first image a location of a part of the first image that corresponds to a pre-determined part of the second image based on a pre-determined similarity criterion; and a copying circuit 308 configured to copy the pre-determined part of the second image to a location in an output image based on the determined location. The first image acquirer 302, the second image acquirer 304, the determiner 306, and the copying circuit 308 may be coupled with each other, e.g. via an electrical connection 310 such as e.g. a cable or a computer bus or via any other suitable electrical connection to exchange electrical signals.

According to various embodiments, the first image and the second image may be color images, for example RGB (red-green-blue) color images.

According to various embodiments, the first image and the second image may be black-and-white images.

According to various embodiments, the output image may be of the second spatial resolution.

According to various embodiments, the pre-determined similarity criterion may be or may include a criterion for comparing the first image with the second image.

According to various embodiments, the pre-determined similarity criterion may be or may include a sum of absolute differences between pixel values of the first image and pixel values of the second image and/or a sum of squares of differences between pixel values of the first image and pixel values of the second image. According to various embodiments, the pre-determined similarity criterion may include or may be minimization the sum of absolute differences between pixel values of the first image and pixel values of the second image and/or minimization the sum of squares of differences between pixel values of the first image and pixel values of the second image.

Figure 4:
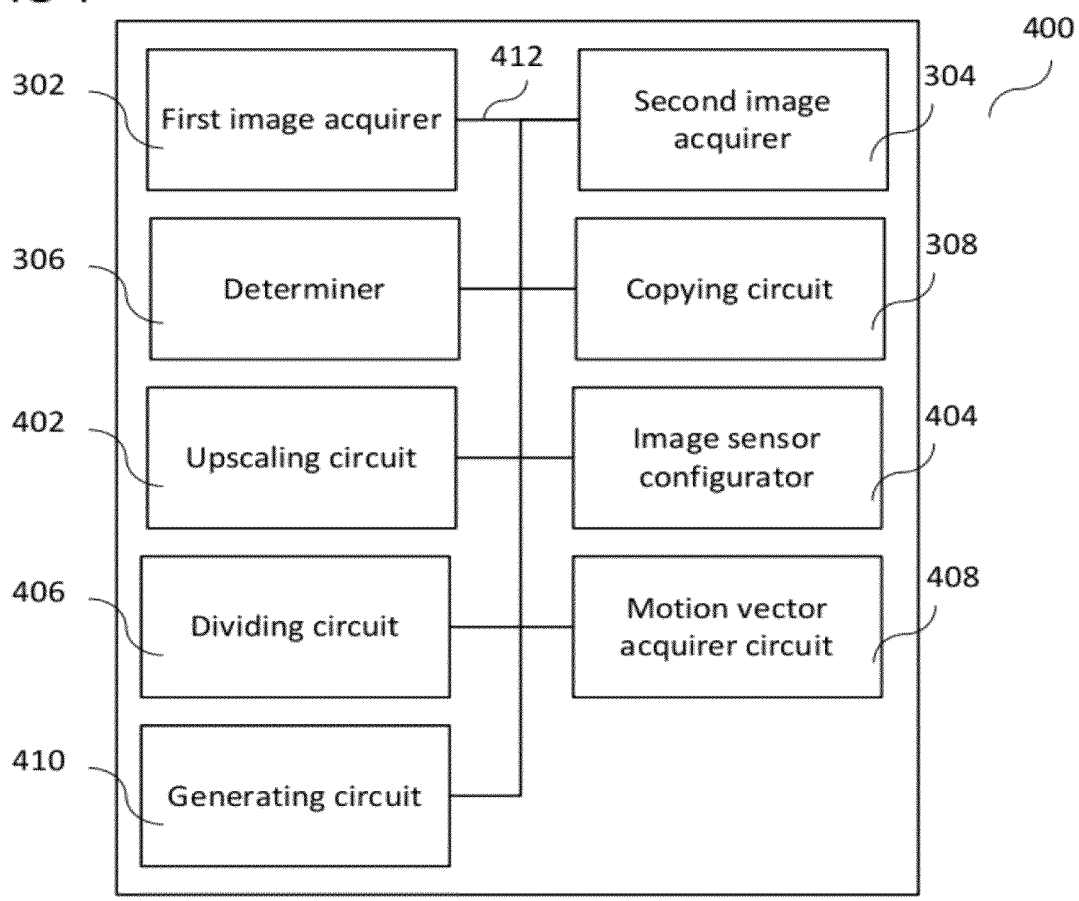
FIG. 4 shows an image processing device in accordance with an embodiment.

FIG. 4 shows an image processing device 400 in accordance with an embodiment. The image processing device 400 may include, similar to the image processing device 300 of FIG. 3, a first image acquirer 302, a second image acquirer 304, a determiner 306, and a copying circuit 308. The image processing device 400 may further include an upscaling circuit 402, like will be described in more detail below. The image processing device 400 may further include an image sensor configurator 404, like will be described in more detail below. The image processing device 400 may further include a dividing circuit 406, like will be described in more detail below. The image processing device 400 may further include a motion vector acquirer 408, like will be described in more detail below. The image processing device 400 may further include generating circuit 410, like will be described in more detail below. The first image acquirer 302, the second image acquirer 304, the determiner 306, the copying circuit 308, the upscaling circuit 402, the image sensor configurator 404, the dividing circuit 406, the motion vector acquirer 408, and the generating circuit 410 may be coupled with each other, e.g. via an electrical connection 310 such as e.g. a cable or a computer bus or via any other suitable electrical connection to exchange electrical signals.

According to various embodiments, the upscaling circuit 402 may be configured to upscale the first image to the second spatial resolution. According to various embodiments, the determiner 306 may be further configured to determine in the upscaled first image a location of a part of the upscaled first image that corresponds to the pre-determined part of the second image based on a further pre-determined similarity criterion.

According to various embodiments, the copying circuit 308 may be further configured to, for a region of the output image, to which no part of the second image has been copied, copy a region of the upscaled first image (for example to the region of the output image, to which no part of the second image has been copied). According to various embodiments, the region of the output image may correspond to or may be equal to the region of the upscaled first image.

According to various embodiments, the further pre-determined similarity criterion may include or may be a criterion for comparing the upscaled first image with the second image.

According to various embodiments, the further pre-determined similarity criterion may include or may be a sum of absolute differences between pixel values of the upscaled first image and pixel values of the second image and/or a sum of squares of differences between pixel values of the upscaled first image and pixel values of the second image. According to various embodiments, the further pre-determined similarity criterion may include or may be minimization the sum of absolute differences between pixel values of the upscaled first image and pixel values of the second image and/or minimization the sum of squares of differences between pixel values of the upscaled first image and pixel values of the second image.

According to various embodiments, the first image may be of a first temporal resolution and the second image may be of a second temporal resolution. According to various embodiments, the first temporal resolution may be higher than the second temporal resolution.

According to various embodiments, the second image acquirer 304 may include a rolling shutter sensor.

According to various embodiments, the first image acquirer 302 and the second image acquirer 304 may include a common sensor.

According to various embodiments, the image sensor configurator 404 may be configured to configure the common sensor for acquiring the first image to the first spatial resolution and to configure the common sensor for acquiring the second image to the second spatial resolution.

According to various embodiments, the dividing circuit 406 may be configured to divide the second image into a plurality of blocks of pre-determined size. According to various embodiments, wherein the pre-determined part of the second image may correspond to or may be a block of the plurality of blocks.

According to various embodiments, the motion vector acquirer 408 may be configured to acquire at least one motion vector based on performing motion estimation of the second image with respect to the first image. According to various embodiments, the generating circuit 410 may be configured to generate the output image based on performing motion compensation of the second image based on the acquired at least one motion vector.

According to various embodiments, the generating circuit 410 may comprise the copying circuit 308.

FIG. 5 shows a flow diagram 500 illustrating an image processing method in accordance with an embodiment. In 502, a first image of a first spatial resolution may be acquired. In 504, a second image of a second spatial resolution may be acquired, wherein the second spatial resolution may be higher than the first spatial resolution. In 506, in the first image, a location of a part of the first image that corresponds to a pre-determined part of the second image may be determined based on a pre-determined similarity criterion. In 508, the pre-determined part of the second image may be copied to a location in an output image based on the determined location.

According to various embodiments, the first image and the second image may be color images, for example RGB (red-green-blue) color images.

According to various embodiments, the first image and the second image may be black-and-white images.

According to various embodiments, the output image may be of the second spatial resolution.

According to various embodiments, the pre-determined similarity criterion may be or may include a criterion for comparing the first image with the second image.

According to various embodiments, the pre-determined similarity criterion may be or may include a sum of absolute differences between pixel values of the first image and pixel values of the second image and/or a sum of squares of differences between pixel values of the first image and pixel values of the second image. According to various embodiments, the pre-determined similarity criterion may include or may be minimization the sum of absolute differences between pixel values of the first image and pixel values of the second image and/or minimization the sum of squares of differences between pixel values of the first image and pixel values of the second image.

According to various embodiments, the image processing method may further include upscaling the first image to the second spatial resolution. According to various embodiments, the determining of a part of the first image may be performed by determining in the upscaled first image a location of a part of the upscaled first image that corresponds to the pre-determined part of the second image based on a further pre-determined similarity criterion.

According to various embodiments, for a region of the output image, to which no part of the second image has been copied, a region of the upscaled first image may be copied (for example to the region of the output image, to which no part of the second image has been copied). According to various embodiments, the region of the output image may correspond to or may be equal the region of the upscaled first image.

According to various embodiments, the further pre-determined similarity criterion may include or may be a criterion for comparing the upscaled first image with the second image.

According to various embodiments, the further pre-determined similarity criterion may include or may be a sum of absolute differences between pixel values of the upscaled first image and pixel values of the second image and/or a sum of squares of differences between pixel values of the upscaled first image and pixel values of the second image. According to various embodiments, the further pre-determined similarity criterion may include or may be minimization the sum of absolute differences between pixel values of the upscaled first image and pixel values of the second image and/or minimi-zation the sum of squares of differences between pixel values of the upscaled first image and pixel values of the second image.

According to various embodiments, the first image may be of a first temporal resolution and the second image may be of a second temporal resolution. According to various embodiments, the first temporal resolution may be higher than the second temporal resolution.

According to various embodiments, the second image may be acquired by a rolling shutter sensor.

According to various embodiments, the first image and the second image may be acquired by a common sensor.

According to various embodiments, for acquiring the first image, the common sensor may be configured to the first spatial resolution, and for acquiring the second image, the common sensor may be configured to the second spatial resolution.

According to various embodiments, the second image may be divided into a plurality of blocks of pre-determined size. According to various embodiments, the pre-determined part of the second image may correspond to or may be or may include a block of the plurality of blocks.

According to various embodiments, at least one motion vector may be acquired based on performing motion estimation of the second image with respect to the first image. According to various embodiments, the output image may be generated based on performing motion compensation of the second image based on the acquired at least one motion vector.

FIG. 6 shows an image processing device 600 in accordance with an embodiment. The image processing device 600 may include: a first image acquirer 602 configured to acquire a first image of a first spatial resolution; a second image acquirer 604 configured to acquire a second image of a second spatial resolution, wherein the second spatial resolution may be higher than the first spatial resolution; an upscaling circuit 606 configured to upscale the first image to the second spatial resolution; a motion vector acquirer 608 configured to acquire at least one motion vector based on performing motion estimation of the second image with respect to the upscaled first image; and a generating circuit 610 configured to generate an output image based on performing motion compensation of the second image based on the acquired at least one motion vector. The first image acquirer 602, the second image acquirer 604, the upscaling circuit 606, the motion vector acquirer 608, and the generating circuit 610 may be coupled with each other, e.g. via an electrical connection 612 such as e.g. a cable or a computer bus or via any other suitable electrical connection to exchange electrical signals.

FIG. 7 shows a flow diagram 700 illustrating an image processing method in accordance with an embodiment. In 702, a first image of a first spatial resolution may be acquired. In 704, a second image of a second spatial resolution may be acquired, wherein the second spatial resolution may be higher than the first spatial resolution. In 706, the first image may be upscaled to the second spatial resolution. In 708, at least one motion vector may be acquired based on performing motion estimation of the second image with respect to the upscaled first image. In 710, an output image may be generated based on performing motion compensation of the second image based on the acquired at least one motion vector.

According to various embodiments, a computer program product may be provided, that, when executed on a computer, may perform one of the methods described above.

According to various embodiments, method and apparatuses to reduce rolling shutter inflicted artifacts in camera generated images may be provided.

According to various embodiments, temporal information about the scene may be acquired and expected artifacts may be corrected based on this information.

According to various embodiments, (for example at first) a low resolution image (which may correspond to the first image described above and below) may be taken. Since horizontal and vertical resolution may be reduced alike, the resulting frame may be read out within a much shorter period of time than a full resolution frame. For example, a frame may be under sampled with a factor of eight in both horizontal and vertical direction, thus leading to readout time approximately 1/64th of the full resolution read out.

Due to the short readout time, the low resolution frame (in other words: the reference frame or the first image), may show hardly any rolling shutter inflicted artifacts and may therefore serve as a model for a full resolution frame that may be taken (for example immediately after the reference frame has been recorded).

In the following, an image showing how shorter readout periods may lead to significantly reduced artifacts will be described. It is to be noted that the readout of one line may be sped up as well as the number of lines to be read may be reduced.

For illustration purposes, in the illustrations described below, a down sampling factor of only two may be assumed. Furthermore, for the sake of clarity, for the illustration described below, the velocity of the object in the down sampled image has been reduced by a factor of two.

FIG. 8 shows a diagram 800 illustrating image acquisition of a first image in accordance with an embodiment. For example, the first image (in other words: the low resolution reference image) may be acquired.

For example, at a time T, with the rolling shutter mechanism, the pixels of the first line of the first image may be acquired, like indicated by a first arrow 806. A ball 804 (shown in dark grey) may be present. Pixels corresponding to the ball 804 may be acquired in the first line of the first image, so that a representation of the ball in the first line may be acquired and may be added to the first image 802 that has been acquired so far. In the example shown, no pixel in the first line may correspond to the ball, so that only a line of background pixels (shown in white) may be acquired.

For example, at a time T+0.5 (note that compared to acquiring the second image, which may be of full resolution, for example like described with reference to FIG. 2 above, it takes less time to acquire one line of the image), with the rolling shutter mechanism, the pixels of the second line of the first image may be acquired, like indicated by a second arrow 814. The ball may have moved to the right in the mean time, so that now a ball 812 at a position more to the right than in the previous time step may be present. Pixels corresponding to the ball 812 may be acquired in the second line of the first image, so that a representation 816 (shown in light grey) of the ball in the second line may be acquired and may be added to the first image 810 that has been acquired so far.

For example, at a time T+1, with the rolling shutter mechanism, the pixels of the third line of the first image may be acquired, like indicated by a third arrow 822. The ball may have moved to the right in the mean time, so that now a ball 820 at a position more to the right than in the previous time step may be present. Pixels corresponding to the ball 820 may be acquired in the third line of the first image, so that a representation 824 of the ball in the third line may be acquired and may be added to the first image 818 that has been acquired so far.

For example, at a time T+1.5, with the rolling shutter mechanism, the pixels of the fourth line of the first image may be acquired, like indicated by a fourth arrow 830. The ball may have moved to the right in the mean time, so that now a ball 828 at a position more to the right than in the previous time step may be present. Pixels corresponding to the ball 828 may be acquired in the fourth line of the first image, so that a representation 832 of the ball in the fourth line may be acquired and may be added to the first image 826 that has been acquired so far.

For example, at a time T+2, with the rolling shutter mechanism, the pixels of the fifth line of the first image may be acquired, like indicated by a fifth arrow 838. The ball may have moved to the right in the mean time, so that now a ball 836 at a position more to the right than in the previous time step may be present. Pixels corresponding to the ball 836 may be acquired in the fifth line of the first image, so that a representation 840 of the ball in the fifth line may be acquired and may be added to the first image 834 that has been acquired so far.

For example, at a time T+2.5, with the rolling shutter mechanism, the pixels of the sixth line of the first image may be acquired, like indicated by a sixth arrow 846. The ball may have moved to the right in the mean time, so that now a ball 844 at a position more to the right than in the previous time step may be present. Pixels corresponding to the ball 844 may be acquired in the sixth line of the first image. In the example shown, no pixel in the sixth line of the first image may correspond to the ball, so that only a white line may be acquired, and may be added to the first image 842 that has been acquired so far.

The time for acquiring a line of the first image may be less than the time for acquiring a line of the second image, and the number of lines of the first image may be less than the number of lines of the second image, because of the reduced spatial resolution of the first image compared to the second image. The shorter time (for example 3 time intervals for the first image like described with reference to FIG. 8 compared to 12 time intervals for the second image like described with reference to FIG. 2) taken for acquiring the first image may be referred to as a higher temporal resolution of the first image compared to the second image. Therefore, the acquired first image may better resemble the shape of a moving object (for example the ball) than the second image.

FIG. 9 shows a diagram 900 illustrating a generation of an output image in accordance with an embodiment. According to various embodiments, a low resolution reference image 902 (a first image) may be combined (like indicated by a first arrow 908 and a second arrow 910) with a distorted high resolution image 904 (a second image or detail image), resulting in a high resolution image 906 (output image) with clearly reduced artifacts. For example, the output image 906 may include pixel values 916 corresponding to pixel values 914 of the second image and may further include pixel values 918 corresponding to pixel values 912 of the first image.

According to various embodiments, rolling-shutter inflicted artifacts may be overcome by combining an image with high temporal resolution and an image with high spatial resolution into one with both high temporal and spatial resolution.

According to various embodiments, a camera sensor may be attached to an application processing system by means of a digital control and data interface.

According to various embodiments, the camera may support reprogramming of readout time and resolution parameters.

According to various embodiments, two (or more) images may be taken (one (a second image) in full target resolution), and transferred to system memory.

According to various embodiments, ISP (image signal processing) functionality may convert the raw RGB (Bayer Pattern RGB) data of both the reference image (first image) and the full resolution image (second image) to interpolated RGB data (RGB-Pixels).

According to various embodiments, the reference image (first image) may be scaled up to the full resolution (to obtain an upscaled first image) by means of interpolation methods such as bilinear, bicubic or sinc functions. In order to achieve near-real time frame rates dedicated hardware for this operation may be provided.

According to various embodiments, first a buffer which may store the result image may be allocated and initialized.

According to various embodiments, in a next phase, the result image (output image) may be generated in a row-by-row manner: Each row of the result image may be created by a combination of several primitive operations. The row of the high resolution source (second image) image may be split into "homogenous" strides. These homogenous blocks may be found by analyzing the gradients of neighboring pixels. The parts may be copied into the respective row (or nearby rows) of the result image (output image) while shifting, scaling or blending the parts.

According to various embodiments, after each of these block transfer-operations, the mean squared error of the now filled parts of the result image (output image) and the upscaled low resolution reference image (upscaled first image) may be calculated. Using this value in conjunction with a gradient descent method may be provided for finding an image that relates to a local minimum in the mean squared error function (while assure maximum cover of the result image).

According to various embodiments, pixels that are not covered after the process found a local minimum may be filled with the respective pixel values obtained from the low resolution reference image (first image). The final image therefore (output image) may contain small artifacts around moving objects, as can be seen in the images described below.

According to various embodiments, an image of high (spatial) resolution (a second image, for example image A) may be manipulated so that it gets close to an image of low (spatial) resolution (a first image, for example image B). Differences in the two images may occur due to exposure of the motion of one or more objects during one or two of the exposures of the images. According to various embodiments, for every pixel $pa_{i,j}$ (wherein i and j may be the coordinates in the image) in image A, a vector $\vec{v}$ may be acquired, so that moving the pixel by this vector gives the "corresponding" pixel $pb_{k,l}$ in image B, in other words:

$(k,l)=(i,j)+\vec{v}$ and $pb_{k,l}=pa_{i,j}$.

According to various embodiments, the motion vector $\vec{v}$ may be acquired as follows. According to various embodiments, first, image B may be upscaled to the (spatial) resolution of image A. This may be done using for example bilinear interpolation, bicubic interpolation, sinc interpolation or any other commonly used interpolation. In accordance with various embodiment, then a block may be cut around the pixel in image A. According to various embodiments, the size of the block may be between 10 and 20 pixels in each direction (horizontal and vertical), for example 16, or any other power of 2, which may make implementation easy. According to various embodiments, blocks that are not of square size, but for example rectangular blocks with the number of pixels in a horizontal direction different from the number of pixels in a vertical direction, may be used. According to various embodiments, it may be tried to find a region in image B which matches as good as possible with this block. According to various embodiments, a degree of matching may be determined based on a measure like for example sum of (squares of) errors. For example, a simple search algorithm may, starting from the position of the block in image A, exhaustively be moved over the image B, and the degree of matching may be computed for each of the positions. For example, the position with the highest degree of match may be the position of the block in image B. According to various embodiments, the vector $\vec{v}$ may be acquired based on the position of the block in image A and the corresponding position in image B. It is to be noted that this approach may be computationally expensive. According to various embodiments, by making various assumptions, the computational effort may be reduced by orders of magnitude. According to various embodiments, alternative methods commonly used in image processing, measurement technology and video encoding may be used, for example optimized block matching methods, phase correlation and similar methods in the frequency domain, methods for computation of optical flow, for example Horn-Schunk method.

According to various embodiments, after the vectors have been found (which may be referred to as motion estimation), the output image may be created for example by copying the pixels of image A to the corresponding position in the output image (which may be referred to as motion compensation). According to various embodiments, positions that have not been filled by copying pixels of image A, may be filled with pixels of the upscaled image B. According to various embodiments, in order to obtain a smooth transition from regions stemming from image A and regions stemming from image B, pixels in the transition zone may be crossfaded by pixels from image B.

According to various embodiments, a resulting image (output image) may be obtained that may have been corrected from rolling shutter artifacts.

In the following, images of a simulation of various embodiments are shown. In the artificial scene, the car may be moving from left to right.

Figure 10:
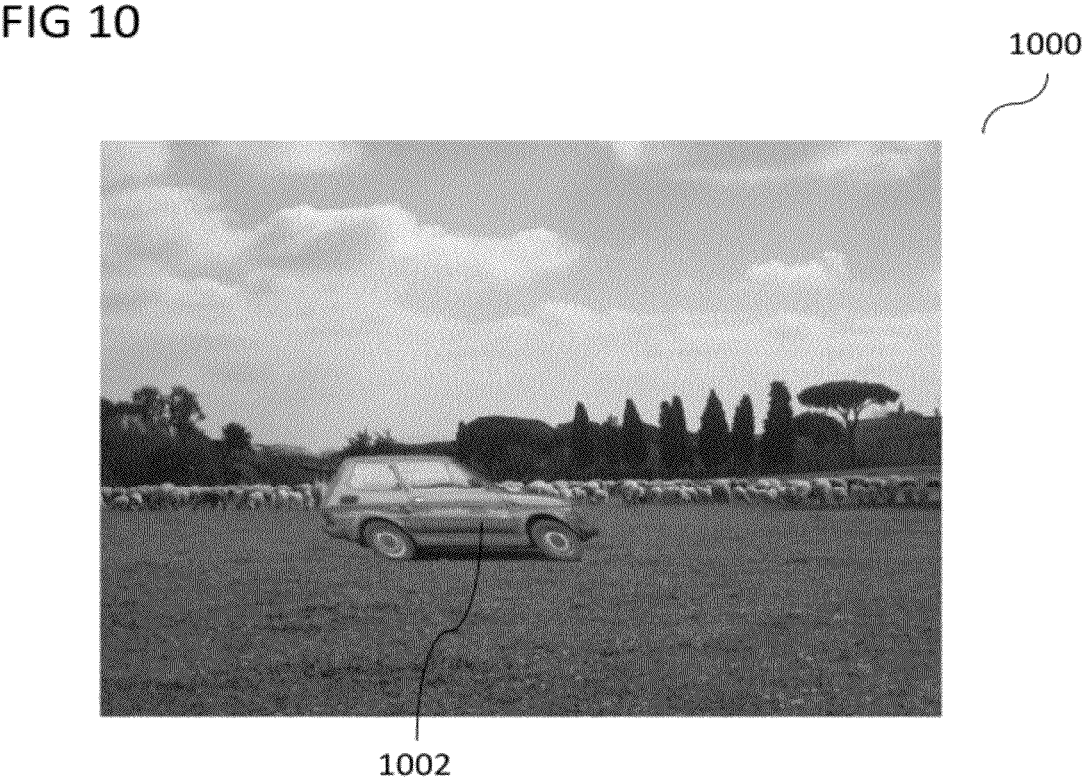
FIG. 10 shows a second image in accordance with an embodiment.

FIG. 10 shows a second image 1000 in accordance with an embodiment. In the second image 1000 which may be full resolution image, distortions due to the movement of the car are shown. Thus, the car 1002 looks like the lower part of the car would be moved to the left compared with the upper part of the car, which may be due to the time having passed between the readout of the upper lines of the image 1000 and the lower lines of the image 1000.

Figure 11:
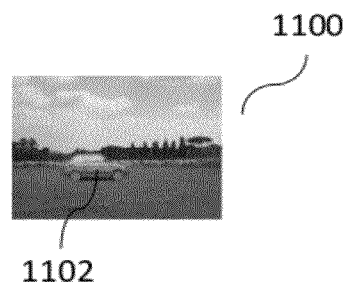
FIG. 11 shows a first image in accordance with an embodiment.

FIG. 11 shows a first image 1100 (low resolution reference image) in accordance with an embodiment. Because the temporal resolution of the first image 1100 is higher than the temporal resolution of the second image 1000, the car 1102 shown in the image 1100 does not show (or does merely show) distortions like the car 1002 of the second image 1000.

Figure 12:
FIG. 12 shows an upscaled first image in accordance with an embodiment.

FIG. 12 shows an upscaled first image 1200 in accordance with an embodiment. The upscaled first image 1200 may be obtained by upscaling the low resolution reference image 1100 of FIG. 11, for example using sinc interpolation. The car 1202 does not show distortions, similar to the first image 1100.

Figure 13:
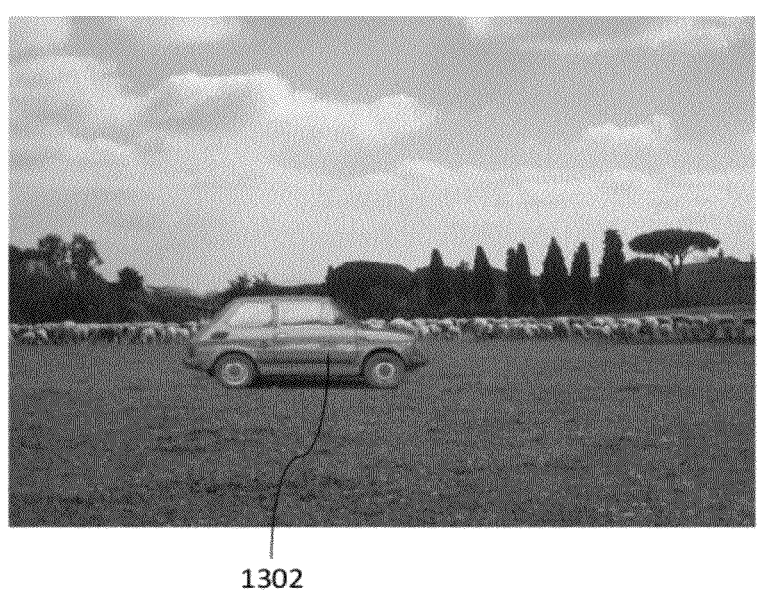
FIG. 13 shows an output image in accordance with an embodiment.

FIG. 13 shows an output image 1300 (resulting image) in accordance with an embodiment. It is to be noted that the car

1302 shown in image 1300 shows less distortion than in the image 1000, and has a higher spatial resolution than the car 1202 shown in the upscaled first image 1200.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. An image processing device, comprising:
    a first image acquirer configured to acquire a first image over a first readout time;
    a second image acquirer configured to acquire a second image over a second readout time, wherein the second readout time is longer than the first readout time;
    a determiner configured to determine in the first image a location of an object in a portion of the first image that corresponds to a pre-determined part of the second image based on a pre-determined similarity criterion, wherein the pre-determined part of the second image is distorted due to movement of the object during the second readout time; and
    a copying circuit configured to copy the pre-determined part of the second image to a location in an output image corresponding to the determined location of the object in the first image;
    wherein the location in the output image is different from the location of the pre-determined part of the second image.

2. The image processing device of claim 1,
    wherein the pre-determined similarity criterion is a criterion for comparing the first image with the second image.

3. The image processing device of claim 1, further comprising:
    an upscaling circuit configured to upscale the first image to the spatial resolution of the second image;
    wherein the determiner is further configured to determine in the upscaled first image a location of a part of the upscaled first image that corresponds to the pre-determined part of the second image based on a further pre-determined similarity criterion.

4. The image processing device of claim 3,
    wherein the copying circuit is further configured to, for a region of the output image, to which no part of the second image has been copied, copy a region of the upscaled first image;
    wherein the region of the output image corresponds to the region of the upscaled first image.

5. The image processing device of claim 3,
    wherein the further pre-determined similarity criterion is a criterion for comparing the upscaled first image with the second image.

6. The image processing device of claim 1,
    wherein the first image is of a first temporal resolution and the second image is of a second temporal resolution; and
    wherein the first temporal resolution is higher than the second temporal resolution.

7. The image processing device of claim 1,
    wherein the second image acquirer comprises a rolling shutter sensor.

8. The image processing device of claim 1,
    wherein the first image acquirer and the second image acquirer comprise a common sensor.

9. The image processing device of claim 8, further comprising:
    an image sensor configurator configured to configure the common sensor for acquiring the first image to the spatial resolution of the first image and to configure the common sensor for acquiring the second image to the spatial resolution of the second image.

10. The image processing device of claim 1, further comprising:
    a dividing circuit configured to divide the second image into a plurality of blocks of pre-determined size;
    wherein the pre-determined part of the second image corresponds to a block of the plurality of blocks.

11. The image processing device of claim 1, further comprising:
    a motion vector acquirer configured to acquire at least one motion vector based on performing motion estimation of the second image with respect to the first image; and
    a generating circuit configured to generate the output image based on performing motion compensation of the second image based on the acquired at least one motion vector.

12. The device of claim 1,
    wherein the copying circuit is configured to correct distortion due to movement occurring during the second readout time.

13. An image processing method, comprising:
    acquiring a first image over a first readout time;
    acquiring a second image over a second readout time, wherein the second readout time is longer than the first readout time;
    determining in the first image a location of an object in a portion of the first image that corresponds to a pre-determined part of the second image based on a pre-determined similarity criterion, wherein the pre-determined part of the second image is distorted due to movement of the object during the second readout time; and
    copying the pre-determined part of the second image to a location in an output image corresponding to the determined location of the object in the first image;
    wherein the location in the output image is different from the location of the pre-determined part of the second image.

14. The image processing method of claim 13,
    wherein the pre-determined similarity criterion is a criterion for comparing the first image with the second image.

15. The image processing method of claim 13, further comprising:
    upscaling the first image to the spatial resolution of the second image;
    wherein the determining of a part of the first image is performed by determining in the upscaled first image a location of a part of the upscaled first image that corresponds to the pre-determined part of the second image based on a further pre-determined similarity criterion.

16. The image processing method of claim 15, further comprising:
    for a region of the output image, to which no part of the second image has been copied, copying a region of the upscaled first image;
    wherein the region of the output image corresponds to the region of the upscaled first image.

17. The image processing method of claim 15,
wherein the further pre-determined similarity criterion is a criterion for comparing the upscaled first image with the second image.

18. The image processing method of claim 13,
wherein the first image is of a first temporal resolution and the second image is of a second temporal resolution; and
wherein the first temporal resolution is higher than the second temporal resolution.

19. The image processing method of claim 13,
wherein the second image is acquired by a rolling shutter sensor.

20. The image processing method of claim 13,
wherein the first image and the second image are acquired by a common sensor.

21. The image processing method of claim 13, further comprising:
dividing the second image into a plurality of blocks of pre-determined size;
wherein the pre-determined part of the second image corresponds to a block of the plurality of blocks.

22. The image processing method of claim 13, further comprising:
acquiring at least one motion vector based on performing motion estimation of the second image with respect to the first image; and
generating the output image based on performing motion compensation of the second image based on the acquired at least one motion vector.

* * * * *